United States Patent [19]
Watanabe et al.

[11] 3,834,615
[45] Sept. 10, 1974

[54] METHOD FOR MONITORING MACHINING CONDITION OF MACHINE TOOL

[75] Inventors: Toshiaki Watanabe, Kasugai; Hideo Yuhara, Nagoya, both of Japan

[73] Assignee: Okuma Machinery Works, Ltd., Kita-ku, Nagoya-shi, Japan

[22] Filed: Oct. 20, 1972

[21] Appl. No.: 299,562

[30] Foreign Application Priority Data
Mar. 23, 1972 Japan.............................. 47-29248

[52] U.S. Cl............. 235/151.11, 73/104, 235/151.3
[51] Int. Cl............................................. G01b 5/28
[58] Field of Search ....... 73/104; 235/151.3, 151.11

[56] References Cited
UNITED STATES PATENTS
3,326,039   6/1967   Roberts................................ 73/104

*Primary Examiner*—Eugene G. Botz
*Attorney, Agent, or Firm*—Ladas, Parry, Von Gehr, Goldsmith & Deschamps

[57] ABSTRACT

In a machine tool having a work holder and a cutting tool which is brought into cutting engagement with a workpiece held on the work holder to machine the same, the reaction force on the cutting tool is detected in the form of three components, that is, a backing force component, a feeding force component and a main force component to obtain ratios of one component to the other two components. The ratios are then compared with coresponding reference values which vary in accordance with the initial values of the ratios, so as to detect abnormal conditions of the cutting tool.

6 Claims, 6 Drawing Figures

METHOD FOR MONITORING MACHINING CONDITION OF MACHINE TOOL

BACKGROUND OF THE INVENTION

The present invention relates to a machine tool and more particularly to a method for monitoring machining condition of a machine tool.

In operation of a machine tool such as a lathe, excessive wear of a cutting edge has an adverse effect on the finish of a workpiece. Hithertofore, it has been a common practice to detect such a wear by an experienced workman. However, this method requires an increased labour since there must be one workman for one machine tool in order to assure a satisfactory operation. Further in a modern high speed machinery or heavy load machining, the cutting edge is often subjected to chipping as well as normal wear, so that it is essential to provide an experienced workman to monitor the condition of the cutting edge in order to perform an automatic operation. In a recent machine tool, it is a tendency that a machine tool is controlled in such a manner that work conditions are automatically determined so as to utilize the full capacity of the cutting edge. Further, it is an ultimate aim of the machine tool industry to provide a complete automatic operation of a machine tool. Thus, there is a need for a method of detecting an abnormal condition of a cutting tool.

In view of this need, the applicant has proposed, by Japanese patent application No. 84263/71 filed on Oct. 22, 1971, a corresponding patent application Ser. No. 299,561 having been filed on Oct. 20, 1972 in the United States, a method for monitoring machining conditions of a machine tool having a work holder and a cutting tool which is adapted to be brought into cutting engagement with a workpiece held on the workpiece to machine the same. The method comprised steps of measuring a backing force component, a feeding force component and a main force component acting on the cutting tool, calculating ratios of respective two force components to the other force component and comparing the ratios with corresponding fixed reference values to detect abnormal conditions during cutting operation, so as to stop the machine tool when it is found that at least one of the ratios exceeds the corresponding reference value. Although the method is advantageous in that the control can be performed with a simple manner, it is still unsufficient to cover all machining conditions. Further, when an eccentric workpiece is machined, since there is a cyclic change in the ratios, the machine may possibly be stopped even before the cutting edge is worn beyond the maximum allowable limit.

SUMMARY OF THE INVENTION

Therefore, it is an object of the present invention to eliminate the above problems.

A further object of the present invention is to provide a method in which said ratios are compared with corresponding reference values which are variable in accordance with the initial values of said ratios of the force components.

Thus, according to the present invention, there is provided a method which comprises steps of measuring a backing force component, a feeding force component, and a main force component acting on a cutting tool of a machine tool, calculating ratios of two force components to the other force component, and comparing the ratios with coresponding reference values to detect abnormal conditions during cutting operation, characterized by the fact that the reference values are determined in accordance with the initial values of the ratios of the force components.

According to a preferred mode of the present invention said reference values are determined by adding a predetermined percentages of the initial values of the corresponding ratios of the force components to the same ratios.

The above and other objects and features of the present invention will become apparent from the following descriptions of a preferred embodiment taking reference to the accompanying drawings.

DESCRIPTION OF THE PREFERRED EMBODIMENT

Figure 1:
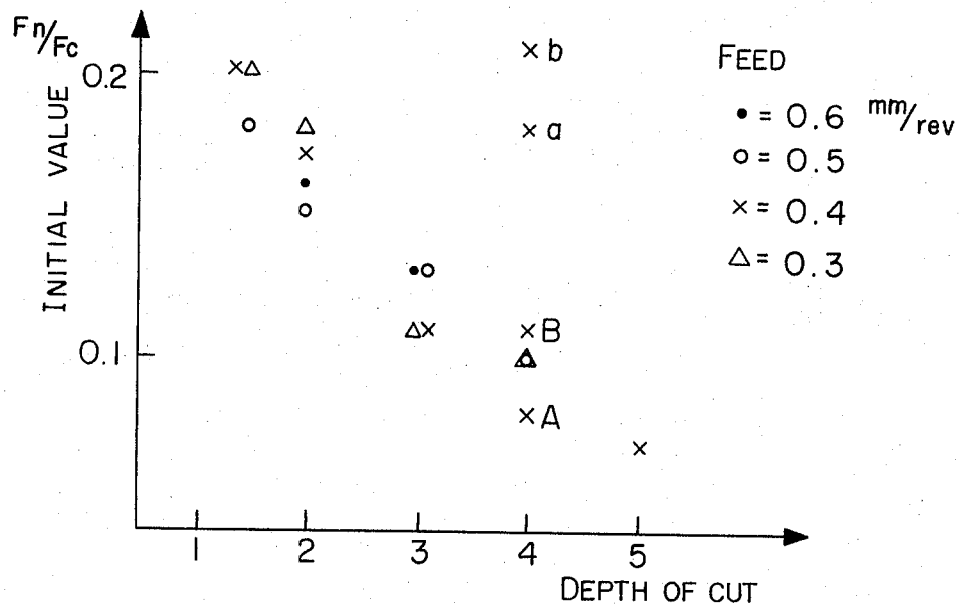
FIGS. 1 through 5 are diagrams explaining the fetures of the present invention.
Figure 2:
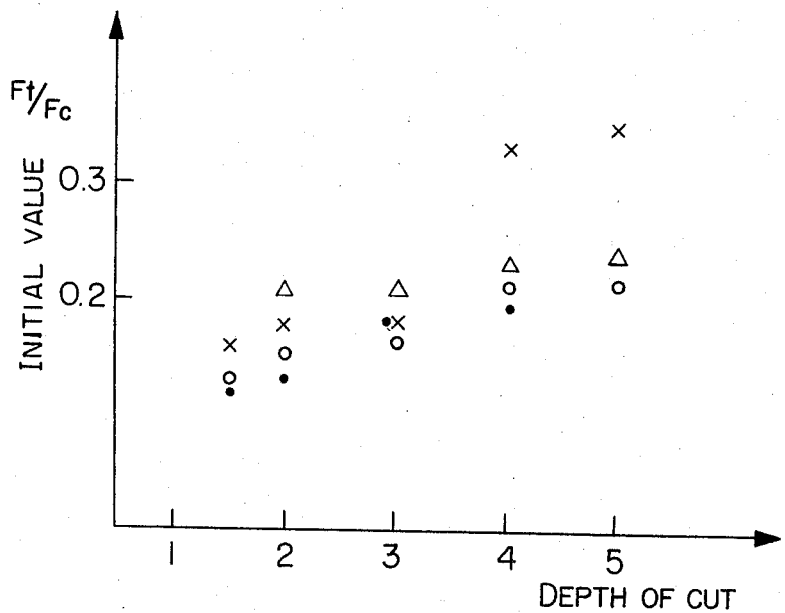

As previously described, according to the present invention, the reaction force acting on the cutting tool of a machine tool is measured in terms of three force components, that is, a backing force component $Fn$, a feeding force component $Ft$, and a main force component $Fc$ to obtain the ratios $Fn/Fc$ and $Ft/Fc$. Referring to FIGS. 1 and 2, there are shown distributions of the initial values of the ratios $Fn/Fc$ and $Ft/Fc$ with respect to the depth of cut ($d$). Referring to the initial values A and B shown in FIG. 1, the cutting edge of the tool subjected to the initial value designated by the reference character (A) is also subjected to the maximum values ($a$) as the machining proceeds. Similarly, the cutting edge which is subjected to the initial value (B) is also subjected to the maximum value ($b$) during operation. According to a preferred mode of the present invention, the reference values for the ratios $Fn/Fc$ and $Ft/Fc$ are determined by adding predetermined percentages of the initial values of the ratios to the initial values. For example, each of the reference values may be 1.1 times the initial value of the coresponding ratio. Further, in view of the fact that the initial values may be large when the cutting edge is worn or broken from the beginning, it is also recommendable to have an ultimate limit value.

Figure 3:
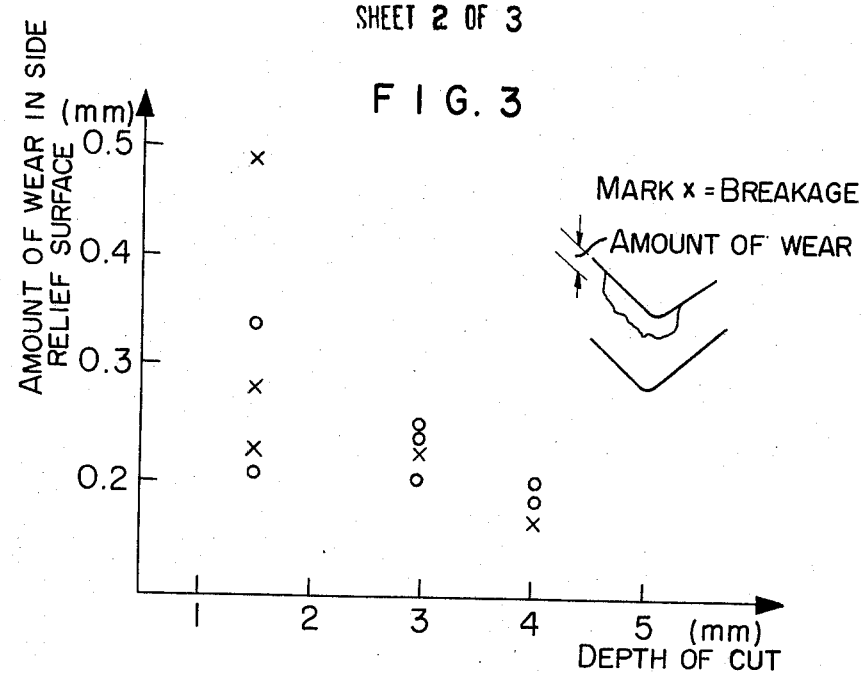

FIG. 3 shows the amount of wear of cutting tools with respect to the cutting depth as measured when the ratio $Fn/Fc$ is increased by 15 percent from the initial value. In the drawing, the mark ($o$) designates acceptable cutting tools and the mark ($x$) designates faulty cutting tools. Thus, it will be seen from FIG. 3 that the value 15 percent excess of the initial value is excessively large as the reference value for the ratio $Fn/Fc$.

Figure 4:
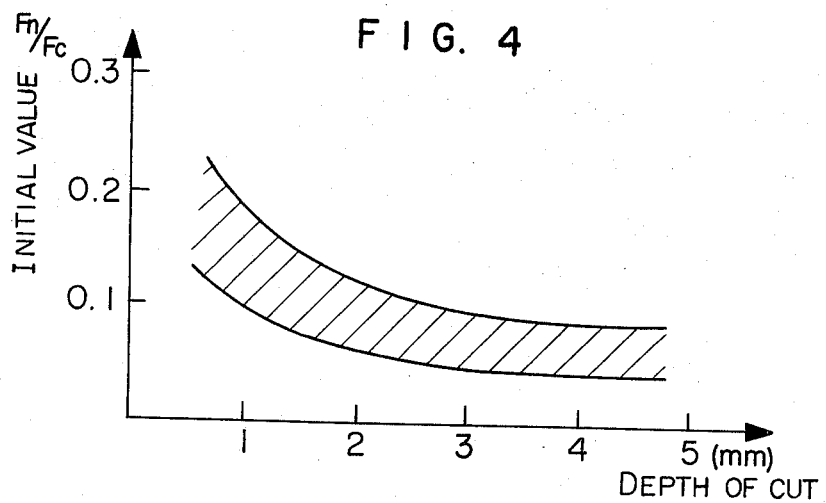
Figure 5:
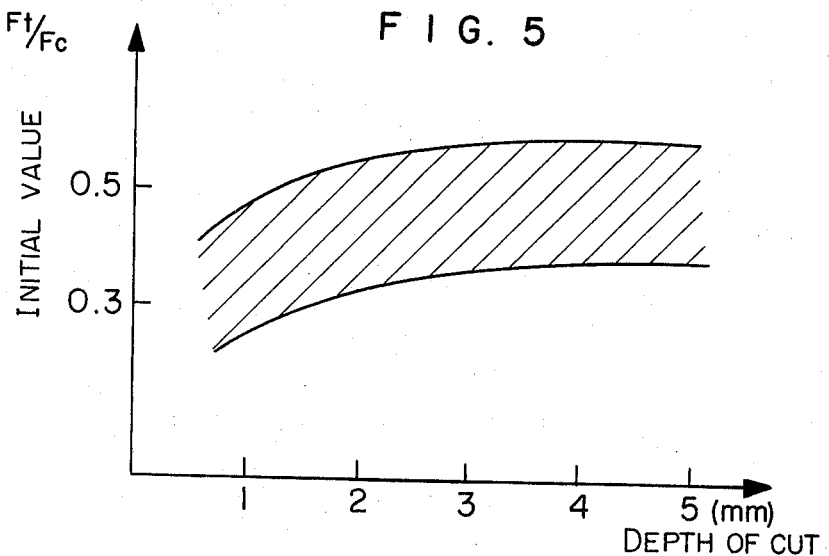

In FIG. 4, there is shown an acceptable range of the ratio $Fn/Fc$. The optimum value for wear is considered as 10 percent of the initial value. From the drawing, it will be seen that the value 0.3 may be selected as the ultimate limit value of the ratio $Fn/Fc$. FIG. 5 shows an acceptable range of the ratio $Ft/Fc$. It may be seen from the drawing that the value 0.6 may be selected as the ultimate limit value of the ratio $Ft/Fc$.

Figure 6:
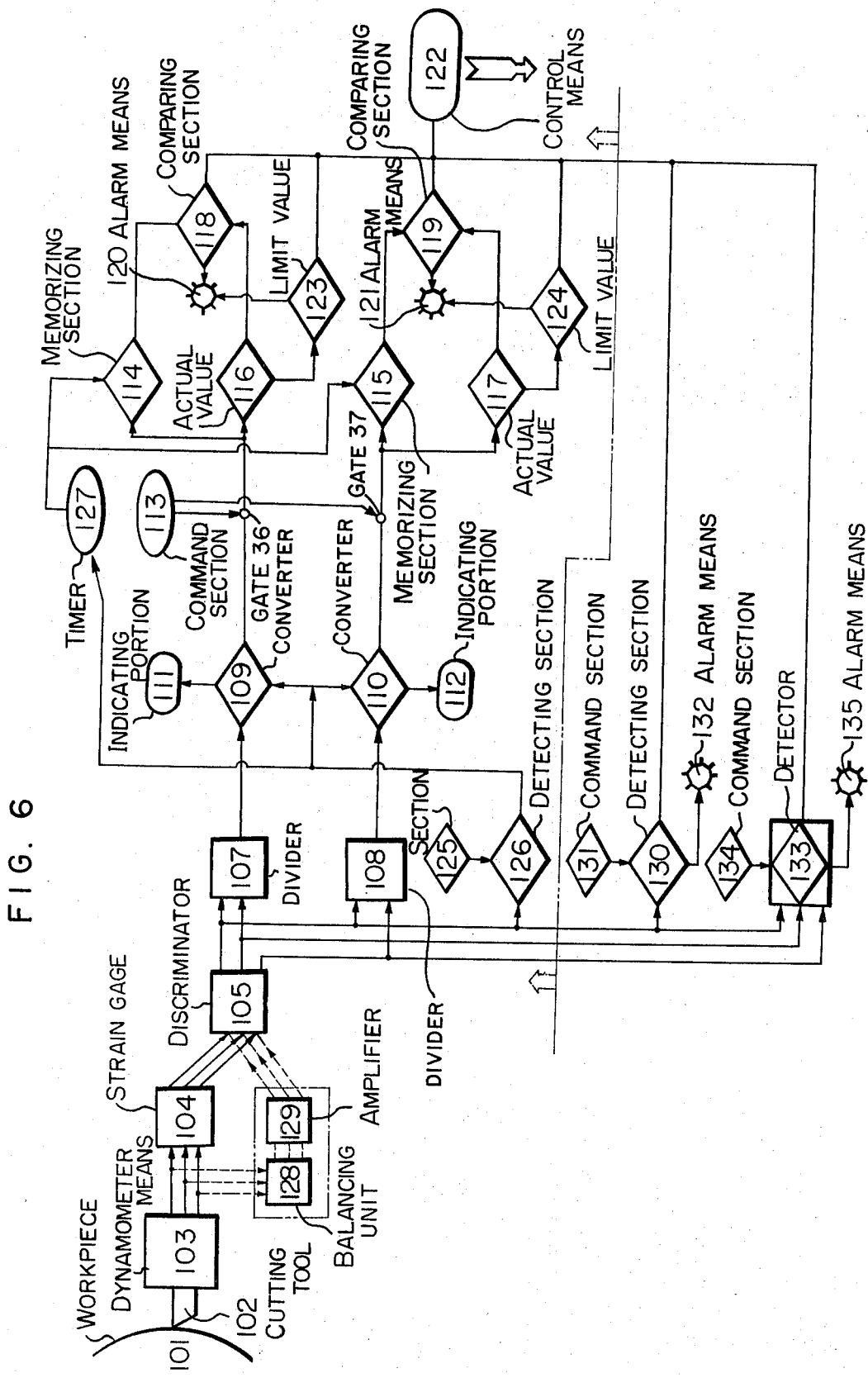
FIG. 6 is a block diagram of an embodiment of the present invention.

FIG. 6 shows in block diagram a preferred embodiment of the present invention. In the drawing, a workpiece on a machine tool is shown by a reference numeral (101) and being machined by means of a cutting tool (102). The reaction force acting on the cutting tool (2) is measured in terms of three force components, that is, a backing force component $Fn$, a feeding force component $Ft$ and a main force component $Fc$, by dynamometer means (103) through a strain meter (104). The signals from the strain meter (104) are introduced into a descriminator (105). The reference numerals (107) and (108) designate operation amplifiers for calculating the ratios $Ft/Fc$ and $Fn/Fc$. The calculated values are then introduced into A–D converters (109) and (110) in which the introduced signals are transferred into digital values to be designated on indicating sections (111) and (112). Command means (13) is provided so that the values $Fn/Fc$ and $Ft/Fc$ corresponding to a predetermined angular position of the machine tool rotatable shaft or of the workpiece are allowed to pass through the circuit. The command means 113 comprises a non-contact relay arrangement, in which the movable side of the relay is mounted on the end of a rotatable shaft of the machine tool, and the fixed side of the relay is mounted adjacent to the end of the shaft. When the movable side passes in front of the fixed side due to rotation of the shaft, ON signals are produced by the fixed side to detect a specific rotary angular position of the shaft. The ON signals are sent to gates 36 and 37, at which inputs from converters 109 and 110 respectively are sent to sections 116 and 117 only when ON signals are sent. The initial values are stored in memorizing sections (114) and (115). The measured values of the ratios at sections (16) and (17) are then compared with the initial values in the memorizing sections (114) and (115) at comparing sections (118) and (119). When either or both of the actual ratios exceed 10 percent excess of the initial values, signals are introduced into the alarm means (120) and (121) to produce an alarm as well as into control means (122) to stop the machine tool.

Further, even when the actual ratios are below 10 percent excess of the initial values, the alarm means (120) and/or (121) are caused to operate and the machine tool is stopped when either of the actual ratios exceeds the corresponding ultimate limit value, that is, 0.6 for the ratio $Ft/Fc$ and 0.3 for the ratio $Fn/Fc$ in this particular example.

In a case where the main force component is lower than the value indicated by a section (125), signals are introduced from a detecting section (126) to the A–D converter (109) and (110) so as to terminate the indication of the indicators (111) and (112) and also terminate signals from the A–D converters (109) and (110) to subsequent sections.

It may be necessary to disregard any instabilities of the ratios at the beginning of the machining operation for this purpose, a timer (127) is provided so that the measured values of $Ft/Fc$ and $Fn/Fc$ are picked up after a certain time delay as the initial values. The time delay is the period from the start of operation to the time when a stable operation is attained. During start of operation, a stable cutting operation in not attained so that the ratios of force components do not show normal values. Therefore, in order that these ratios are not stored as initial values, a timer is used. The reference numeral (128) designates a balancing unit and (129) an amplifier, which may be required when semiconductor strain meters are used as detecting sensors.

The reference numeral (131) designates a command section which provides a reference value for the main force component. When the value of the main force component detected at a detecting section (130) exceeds the limit determined by the section (131) due to an abrupt deccease of the force component caused by a breakage of the cutting edge, a signal is introduced into an alarm means (132) to produce an alarm and at the same time the machine tool is stopped. When each of the force components is abnormally increased, the increase is detected by a detector (133) and compared with a reference value determined by a command section (134). The detector 33 is an OR circuit and produces a STOP signal when either one of three force components exceeds the predetermined values.

The detecting section 130 monitors the main force component of the three cutting force components acting on the cutting tool, and will stop the machine tool by detecting an abrupt reduction of the main force component in case of a fracture of the cutting tool. A change quantity is detected by the means 130. The detector 133 will stop the machine tool by detecting an abnormal cutting condition in the event that at least one of the three cutting force components is above a reference value; the detector 133 detects an absolute value.

From the above description, it will be clear that the present invention provides a positive control of a machine tool by obtaining the ratios $Ft/Fc$ and $Fn/Fc$ and comparing them with reference values which are determined in accordance with the initial values of the force components $Ft$, $Fn$ and $Fc$.

Although the present invention has thus been shown and described with reference to a particular embodiment it should be noted that the invention is in no way limited to the detail of the illustrated arrangement but many changes and modifications may be made without departing from the scope of the appended claims.

We claim:

1. A method for monitoring machining condition of a machine tool having a work holder for holding a workpiece and a cutting tool which is adapted to be brought into cutting engagement with said workpiece, said method comprising steps of measuring a backing force component, a feeding force component and a main force component acting on the cutting tool, calculating ratios of two force components to the other force component, and comparing the ratios with corresponding reference values to detect abnormal conditions during cutting operation, said reference values being determined in accordance with the initial values of the corresponding ratios.

2. A method in accordance with claim 1 in which the ratios of the backing force component and the feeding force component to the main force component are calculated 3. A method in accordance with claim 1 in which said reference values are determined by adding a predetermined percentages of the initial values of the ratios of the force components to the same ratios.

4. A method in accordance with claim 1 in which an ultimate limit value is determined for each of the ratios, so that when at least one of the ratios exceeds the corresponding ultimate limit value the machine tool is stopped.

5. A method in accordance with claim 3 in which said predetermined percentage is 10 percent.

6. A method in accordance with claim 1 in which said ratios are measured at a predetermined angular position of rotation of the workpiece.

* * * * *